March 5, 1935.  C. HEMSTREET  1,993,445
PIGEON FEEDER
Filed Feb. 28, 1931
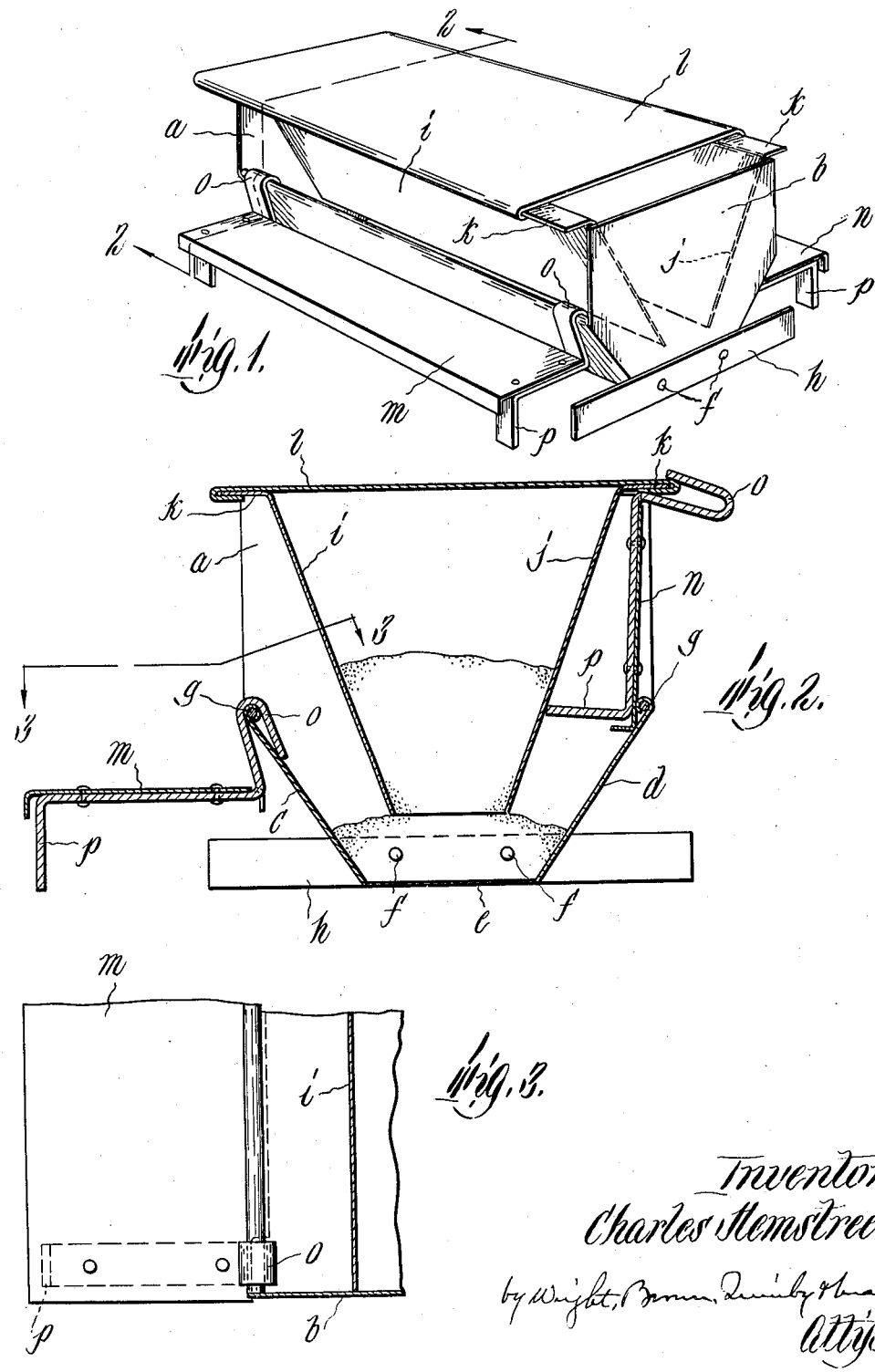
Inventor:
Charles Hemstreet,
by Wright, Brown, Quinby & May
Attys.

Patented Mar. 5, 1935

1,993,445

UNITED STATES PATENT OFFICE 1,993,445

PIGEON FEEDER

Charles Hemstreet, Walton, N. Y., assignor to Elmer C. Rice, Melrose, Mass.

Application February 28, 1931, Serial No. 518,922

6 Claims. (Cl. 119—52)

This invention relates to feeders or feed troughs usable to provide grain and similar feed to pigeons or other birds or fowls, poultry, etc., domesticated or in captivity.

One important object of the invention is concerned with the feeding of pigeons or squabs in captivity and is designed to prevent wastage of the grain. These birds are pickers and choosers in their feeding when provided with grain in a trough, and in the ordinary trough remove and reject grains until they find what suits their fancy. The result is that a large proportion of the grain given to pigeons in the troughs and feeders heretofore used is thrown on the ground, soiled and wasted.

It is the object of this invention to furnish a trough or feeder which so presents food that whatever grains are thus rejected by the birds cannot be thrown out of the trough and wasted, but remain to be consumed later. This object is accomplished by constructing the trough so that the food within reach of the pigeons is at a level below their feet and access to it is through an entrance correctly proportioned to compel the pigeons to turn their heads and necks to right or left in reaching the food so that they cannot by a flip of the head throw entirely out of the trough the grains which they do not choose to eat. Another object is to provide the feeder with means by which it may be easily closed against access to the contents by rats, mice and other vermin when not in use.

Although I have mentioned pigeons as the birds for which I have particularly designed my new feeder, it is to be understood that the protection which I seek is not limited as to the birds or fowl for the feeding of which it may be used, but that I claim its principles in all forms, dimensions and proportions in which it may be embodied, and all uses to which it may be put.

Referring to the drawing,—

Fig. 1 is a perspective view of a feeder embodying the invention;

Fig. 2 is a cross section taken on line 2—2 of Fig. 1 showing one of the two platforms with which it is provided in position for feeding use, and the other in position for closing the entrance which gives access for feeding;

Fig. 3 is a partial plan view of the device.

The preferred form of the feeder is made of sheet metal, such as galvanized iron, with end walls $a$, $b$, downwardly convergent opposite outer side walls $c$, $d$, and a bottom $e$. The end walls are connected together near the bottom by tie rods $f$, $f$, and at a higher elevation by rods $g$, $g$. These latter rods also reinforce the upper edges of the outer walls $c$ and $d$, which are curled around them. Foot pieces $h$ are made fast to the opposite ends of the feeder by the outer ends of the rods $f$, $f$. These foot pieces may be bars of any suitable material, or strips of heavy sheet metal, the ends of which extend beyond the sides of the feeder in extension of the bottom $e$ thereof so as to make a stable base secure against tipping over.

The end walls $a$, $b$ rise above the side walls $c$, $d$. Between them and suitably secured to them are plates or inner walls $i$, $j$, of similar sheet metal which form the lateral walls or side of a supply hopper and the inner sides of two feed troughs or spaces, of which the walls $c$ and $d$ are the respective outer sides. The upper edges $k$ of these plates are turned outward in the same plane and serve conveniently as guides for a sliding cover $l$, likewise made of a piece of sheet metal, the edges of which are bent under, forming channels to receive the guides $k$.

Platforms or perches $m$, $n$ are provided for the birds to stand on while feeding. These platforms are each made of a plate of sheet metal and two or more straps of heavier sheet metal passing crosswise under the plate and riveted thereto, being turned up at one side and formed with a hook $o$ at one end, and bent down at the other end to make a foot $p$ which rests on the ground and is of proper length to support the platform in a substantially horizontal position when the hook is passed over the edge of the side wall.

The space between the walls $c$ and $i$, the height of the upper edge of the outer wall $c$ above the platform $m$, the slant of this wall downward and away from the platform, and the level of the lower edge of the inner wall $i$ are so related to the normal average proportions of the birds for which the feeder is designed that the bird is obliged to bring his beak below the level of his feet, and to turn his head, or whole body more or less, sidewise to these walls, in order to reach the grain. That is, the upper edge of the outer wall is higher than the platform $m$ by the height of the bird's breast, and the lower edge of the inner wall $i$ is below the platform level, while the space between the walls, at least at the bottom where the feed is exposed, is narrower than the distance from the back of the bird's head to the tip of the beak, but greater than the width of the head. The same relations obtain with respect to the walls $d$ and $j$ and the platform $n$ on the opposite side of the feeder. Thus, although the bird can reach the grain without discomfort and eat his fill, the peculiar stance which he is required to assume by reason of these characteristics of the feeder, prevent him from making those motions of the head and neck which would enable him to throw the grain out of the trough. The only way in which he can throw the grain out is by first withdrawing his head and straightening up, but his instinct for selection does not lead to the making of so great an effort. In choosing and rejecting grains, the pigeon makes a quick movement of the head sidewise or upward without taking heed as to where the rejected grain goes. But in this feeder the walls c and i, being close to the opposite sides of the bird's head, prevent such sidewise movements, while backward or forward movements of the head cannot be wide or sudden enough to throw the grain away. The bird can see the grain and is perfectly free to drop one piece and pick up another which seems more desirable, but the rejected pieces are not wasted.

In closing the feeder when not in use, the platform may be taken up and placed in the entrance to the feeding space, as shown with respect to the platform n at the right hand side of Fig. 2. Then the platform extends from the outturned lip of the hopper wall down to slightly below the upper edge of the side wall. It is held in that position by the hooks o taking over the lip, and the legs p bearing on the side of the hopper wall. This makes a secure barrier against entrance of such animals as infest poultry yards. And of course the cover l excludes them from the hopper.

The form of the feeder herein shown and described is thus seen to be of duplex construction; i. e., having two troughs or feeding spaces and two platforms for the birds to stand on, one at each side, with a common supply hopper between the troughs. This is preferred on account of its economy of material in construction and its efficiency in providing a maximum of feeding opportunity with minimum length and bulk; but it will be understood that the invention is not limited in this respect and may equally well be embodied in a construction having a single feeding trough and a hopper with a blank back wall behind the feed trough.

What I claim and desire to secure by Letters Patent is:

1. A pigeon feeding apparatus comprising a trough having end, bottom and side walls, interior walls forming a hopper extending toward but terminating short of the bottom and separated each from the nearer of said side walls by a space of proper width to compel the birds for which the feeder is designed to turn their heads and necks in reaching for the grain which flows from the bottom of the hopper, a platform at a height somewhat above the level of grain emerging from the hopper, the outer wall of the feeder rising to a height above said platform commensurate with the height of the breast of a standing bird of the class for which the feeder is designed.

2. A pigeon feeder comprising a trough having a bottom, inclined sides, and upright end walls rising to a height above the upper edges of said sides, inner walls forming with said end walls a hopper and located with their upper edges above the upper edges of said sides, and their lower terminations between the upper and lower limits of the sides, and a platform having hooks to engage over the upper edge of one of said sides and feet to bear on a surface at the level of said bottom, the platform being at an intermediate height between the upper edge of the side and the lower termination of the adjacent inner wall.

3. A pigeon feeder comprising a trough having a bottom, inclined outer sides, and upright end walls rising to a height above the upper edges of said sides, inner walls forming with said end walls a hopper and located with their upper edges above the upper edges of said inclined outer sides, and their lower terminations between the upper and lower limits of the outer sides, a platform having hooks to engage over the upper edge of one of said sides and feet to bear on a surface at the level of said bottom, the platform being at an intermediate height between the upper edge of the side and the lower terminations of said inner walls, the said inner walls having outturned lips and the platform being of a length and width enabling it to substantially fit the entrance to the space between the lip of one of the inner walls, the adjacent outer side, and the end walls.

4. A pigeon feeding apparatus comprising a bottom and side walls upwardly and outwardly inclined from the bottom, end walls covering the space between said bottom and side walls and rising above the upper terminations of the latter, hopper walls extending between said end walls from above the side walls on inward inclination to a termination near the bottom and having outturned lips at their upper edges, a cover having channels to receive said lips and slide thereon, and platform plates having hooks at one side adapted to engage over either the outturned lips and the embracing cover or over the upper edge of one of the side walls, each platform being of sufficient width to extend from beneath the hopper wall lip to within the upper edge of the adjacent side wall, and of a length to extend substantially from one end wall to the other, and having feet adjacent to the opposite edge from the hooks of a length sufficient to support the platform approximately horizontal when the hooks are engaged with the side wall, and also to hold the platform out to the edge of the side wall, by abutting against the adjacent hopper wall, when the platform is placed in the entrance to the space between the hopper wall and side wall.

5. A pigeon feeder comprising a trough adapted to contain feed, a supply hopper having an opening entering the lower part of said trough to permit flow of feed thereinto, and a perch at the opposite side of the trough from the hopper located above the top of said opening; the side wall of the trough next to the perch rising above the perch, and the distance from such wall to the adjacent side of the hopper being so proportioned to head and neck dimensions of the birds for which the feeder is designed, as to compel the bird to turn its head sidewise in order to reach the feed.

6. A pigeon feeder comprising end walls, side walls and a bottom, one of such side walls providing the side of a hopper and being located with its lower edge at a level above the bottom, an outer side wall rising from the bottom between the end walls outside of the said hopper side wall on an upward and outward slant, the said hopper side wall being slanted in the same direction as the outer wall but with a steeper inclination, and being spaced from said outer wall by a distance wider than the width of a pigeon's head, but shorter than the distance from the back of the head to the pigeon's beak, combined with a perch outside of said outer wall located at a height below the upper edge of the said outer wall and above the lower edge of the adjacent wall; the arrangement being such that pigeons in feeding are compelled to stand on such perch and to turn their heads sidewise and depress their beaks below the level of their feet in order to reach feed flowing from the hopper into the bottom of the space between said outer wall and the adjacent hopper side wall.

CHARLES HEMSTREET.